United States Patent Office 3,783,026
Patented Jan. 1, 1974

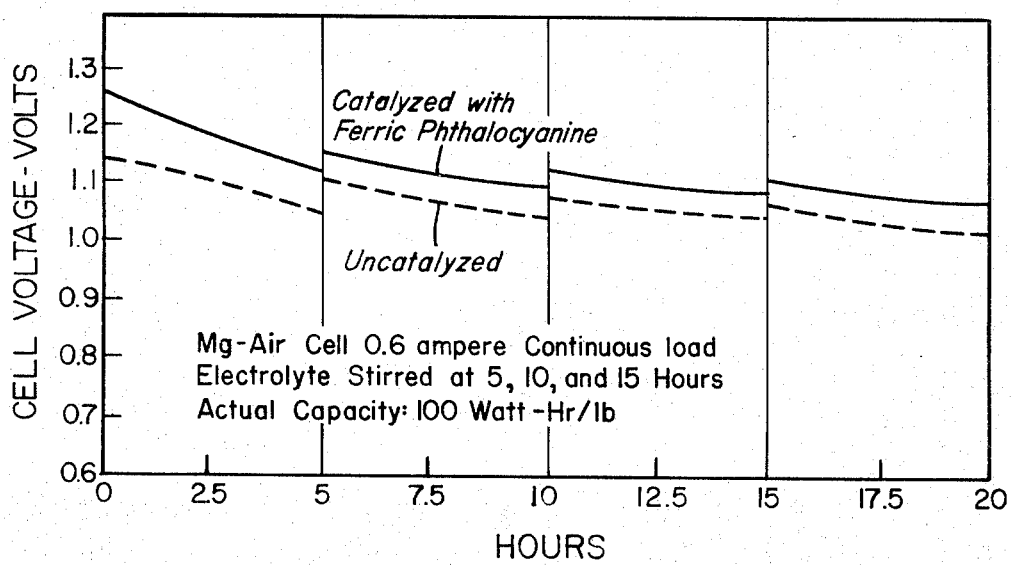
FIG. 4.
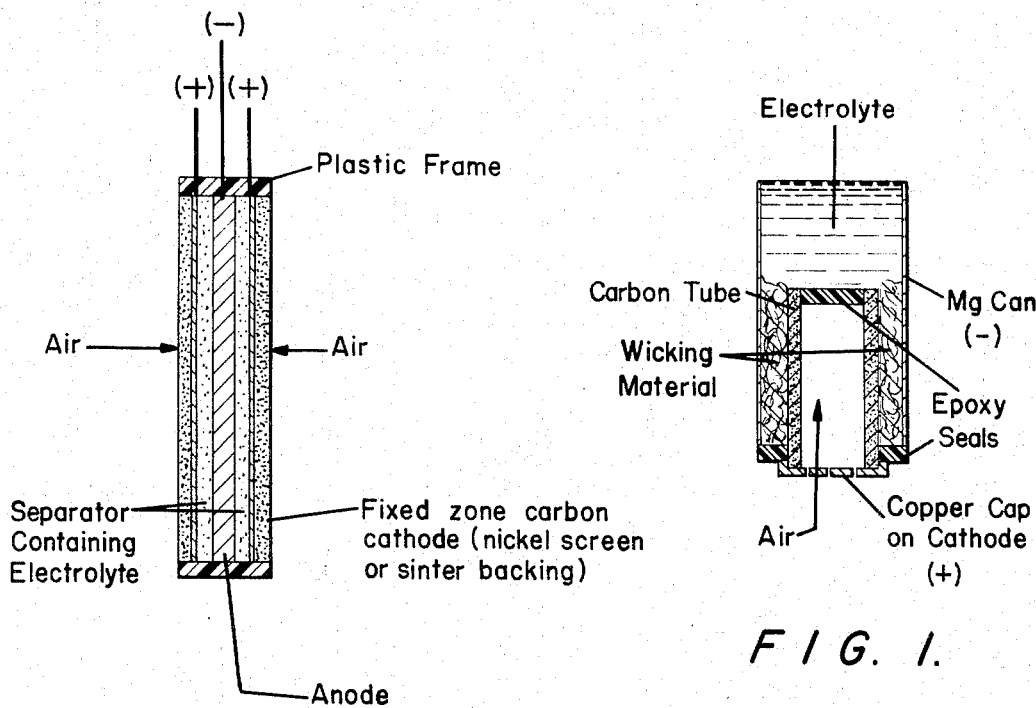
FIG. 5.
FIG. 1.
INVENTOR
Karl V. Kordesch
BY Charles J. Metz
ATTORNEY PERFORMANCE OF D-SIZE Mg-AIR CELL

3,783,026
AIR-DEPOLARIZED CELLS UTILIZING A CYANATE OR THIOCYANATE-CONTAINING ELECTROLYTE
Karl V. Kordesch, Lakewood, Ohio, assignor to Union Carbide Corporation, New York, N.Y.
Filed Mar. 9, 1971, Ser. No. 122,465
Int. Cl. H01m 29/04
U.S. Cl. 136—86 A  14 Claims

ABSTRACT OF THE DISCLOSURE

Air-depolarized cells are disclosed which have an improved aqueous electrolyte. The electrolyte, which is neutral, slightly acid, or slightly alkaline, contains: (a) a salt such as a halide of an alkali metal, alkaline earth metal, aluminum, zinc, or ammonia; and (b) a cyanate or thiocyanate salt. The air-depolarized cells of the invention alleviate the problem of carbonation with attendant plugging of the pores in the cathode that is often encountered with air-depolarized cells utilizing strong alkaline electrolytes.

The invention relates to improved electrolytes for use in air-depolarized galvanic cells, and to the cells which utilize said electrolyte. In a particular aspect, the invention relates to air-depolarized galvanic cells utilizing an improved cyanate or thiocyanate containing electrolyte.

The classic air-depolarized galvanic cell comprises a zinc anode (usually amalgamated zinc), a porous, activated and catalyzed carbon cathode at which oxygen (from the air) reacts, and a strong aqueous alkali electrolyte. Such cells are useful for applications where high capacity at relatively high current drain is desired. One problem that is encountered, however, with such air-depolarized cells is that of carbonation resulting from reaction of the strong alkaline electrolyte with carbon dioxide from the air. Carbonation causes loss of alkali from the electrolyte and plugging of the pores in the cathode, thereby shortening the useful life of the cell.

Attempts to alleviate the problem of carbonation by utilizing neutral, slightly acid, or slightly alkaline electrolytes were initially not successful. Air-depolarized cells using aqueous solutions of ammonium chloride, zinc chloride, magnesium bromide, and other salts frequently used in galvanic cells, do not produce sufficiently high current densities at the electrodes to be of large commercial interest. Moreover, coatings or crusts formed in the pores of the cathode, especially when zinc anodes were used, which caused rapid cathode fouling and failure.

The present invention is based upon the discovery that the addition of cyanate or thiocyanate anion to neutral, slightly acid, or slightly alkaline aqueous electrolytes permits the operation of cells utilizing such electrolytes at useful current densities without the formation of coatings or crusts in the pores of the cathode. As a result, useful air-depolarized cells utilizing such substantially neutral aqueous electrolytes are provided. (The term "substantially neutral" is used herein to mean neutral, slightly acid, or slightly alkaline.)

Accordingly, it is an object of the invention to provide a substantially neutral aqueous electrolyte than can be employed in air-depolarized cells.

Another object of the invention is to provide air-depolarized cells containing an aqueous electrolyte which contains cyanate or thiocyanate anions.

A still further object of the invention is to provide an improved air-depolarized cell having a substantially neutral electrolyte containing cyanate or thiocyanate anions.

These and other objects and advantages of the invention will be apparent from the following description, taken in conjunction with the accompanying drawings wherein:

FIG. 1 represents, schematically, a side elevational cross-sectional view of one form of cell to which the present invention is applicable;

FIGS. 2–4 are graphs which show cell voltage vs. time for various cells, and which illustrate the performance of cells constructed in accordance with the invention; and FIG. 5 represents, schematically, a side elevational cross-sectional view of another form of cell to which the invention is applicable.

Figure 2:
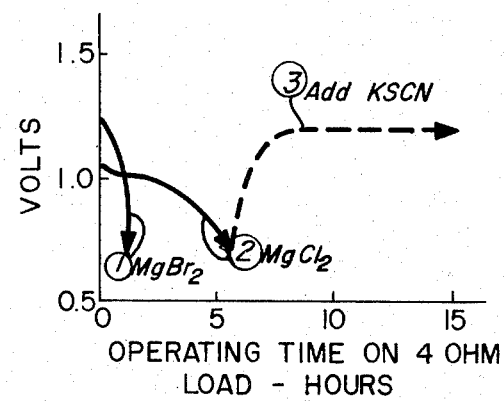

The electrolyte provided by the invention comprises an aqueous solution of (a) a salt such as a halide of an alkali metal, alkaline earth metal, aluminum, zinc, or ammonia; and (b) a cyanate or thiocyanate. Such electrolytes are employed in the air-depolarized cells of the invention.

The air-depolarized cells of the invention can be constructed in accordance with known procedures. The cathode can be any type of cathode customarily used in an air-depolarized cell. For instance, the cathode can be a porous activated carbon tube, a phenolic resin-bonded carbon plate, or a thin flat plastic-bonded carbon electrode of the fixed zone type (see Darland et al., U.S. Patent No. 3,423,247). The cathode can also be a sintered metal such as nickel or silver. Customary cathode catalysts can be used. Examples of such catalysts include $Al_2O_3 \cdot CoO$ spinel, silver, and noble metals.

The anode employed in the air-depolarized cell of the invention can be composed of any metal that is customarily used in air-depolarized cells. Illustrations include magnesium, aluminum, zinc, and cadmium. Magnesium and zinc anodes are preferred.

The electrolyte employed in the cells of the invention comprises an aqueous solution of a solute comprising two components. The first component comprises one or more salts such as a halide of an alkali metal, alkaline earth metal, aluminum, zinc or ammonia. Specific illustrative examples include magnesium bromide, aluminum chloride, magnesium chloride, zinc chloride, zinc bromide, ammonium chloride, ammonium bromide, sodium chloride, potassium bromide, potassium chloride, cadmium bromide, and the like.

While halide salts have been specifically disclosed for purposes of illustration, other salts having similar conductivity, stability, and solubility characteristics can be used if desired. The chloride and bromide salts are preferred, and the bromide salts are more preferred because, in general, they are less prone to cause corrosion of metal components of the cell.

The second component in the electrolyte is one or more cyanate or thiocyanate salts. Specific illustrative examples include potassium thiocyanate, potassium cyanate, sodium thiocyanate, ammonium thiocyanate, zinc thiocyanate, magnesium thiocyanate, and the like. The cation can be the same as the cation of the above-described first component of the electrolyte. In general, the thiocyanate anion is preferred, and the sodium and potassium cations are preferred because their cyanates and thiocyanates are cheaper and quite soluble.

The concentration and proportion of the solute in the aqueous electrolyte can vary over a fairly wide range. For instance, the minimum concentration of the solute will normally be about 10 weight percent, based upon total weight of electrolyte (i.e., based upon total weight of water plus the solute). Concentrations of less than about 10 percent tend to be too low in conductivity in many cases. The upper limit of concentration of the solute in the electrolyte will be, for instance, such that at about 20° to 25° C., neither component is present in a concentration greater than about 75 percent of its saturation concentration. (It will be recognized that the saturation concentration will vary somewhat, depending on the nature of the two components of the solute.) While higher concentrations can be employed, they are not preferred for the reason that water is consumed during operation of the cell. For this reason, if the concentration of either of the two components of the solute is too close to saturation, precipitation could occur after operating the cell for a relatively short period. The preferred concentration of the solute in the electrolyte is from about 20 to about 40 weight percent, based on total weight of electrolyte.

The relative proportion of the two components of the solute can vary over a fairly wide range. For instance, the salt (halide):cyanate or thiocyanate proportion can vary from about 70:30 to about 30:70, preferably from about 60:40 to about 40:60, and more preferably the proportion is about 50:50. (The proportions are on a weight:weight basis.) While proportions above and below the indicated broad range can be employed in some cases, the beneficial anti-fouling properties of the second (cyanate or thiocyanate) component tend to diminish at proportions below 30 percent, and the conductivity of the electrolyte tends to fall to undesirable levels as the proportion of the first component decreases below about 30 percent.

As has been indicated hereinabove, the pH of the electrolyte is about neutral, slightly acid, or slightly alkaline. Thus, the pH of the electrolytes of the invention will normally vary from about 5 to about 9, and is preferably from about 6 to about 9. The lower limit of the pH is that point at which the cyanate or thiocyanate component of the electrolyte decomposes. This point will vary somewhat, depending on the nature of the components of the electrolyte. The upper limit of the pH is selected so as to substantially eliminate the problem of plugging of the pores of the cathode by reaction of the electrolyte with $CO_2$ from the air. If desired, buffering agents can be included in the electrolyte in order to maintain the pH within the desired range.

The discussion above relating to concentrations, proportion, and pH of the electrolyte is applicable to the cell prior to operation. During operation, the pH increases somewhat, and the composition of the electrolyte changes. The water in the electrolyte, and the anode are consumed, and metal ions are converted to oxide or hydroxide. While it is not known for certain, it seems probable that the cyanate or thiocyanate complexes this oxide or hydroxide in some way so as to prevent precipitation and consequent blocking of the cathode.

Other materials that can be present in the electrolyte include corrosion inhibitors, and the like.

The air-depolarized cells of the invention have known utility. For instance, they can be employed as reserve cells to be activated by adding water. They are useful for short term applications requiring cells of relatively high capacity. Such uses include batteries for portable, lightweight radio transmitters and receivers (e.g., "walkie-talkies"), and the like.

The examples which follow illustrate various aspects of the invention. All percentages are by weight, unless otherwise indicated. Also, unless otherwise indicated, percentages of components in an electrolyte are based upon the total weight of the electrolyte. The solvent in each electrolyte was water.

EXAMPLE 1

(a) A D-size air-depolarized round cell was assembled with a zinc can as anode, a porous carbon tube (¾ inch O.D.; ½ inch I.D.; 2 inches long) as cathode, and a 30 weight percent aqueous $ZnCl_2$ electrolyte (percentage based on total weight of electrolyte) (pH=r5). The cathode contained a spinel catalyst, which was added to the cell in the following manner:

A 0.1 M cobalt nitrate and 0.2 M aluminum nitrate aqueous solution was prepared. The porous carbon tube (about 30 percent porosity) to be used as the cathode was soaked in this solution to impregnate the tube. The impregnated carbon tube was then heated in accordance with the method described in U.S. Pats. Nos. 2,615,932 and 2,669,598 (Kordesch et al.) to produce the $Al_2O_3 \cdot CoO$ spinel catalyst in the carbon tube.

This cell operated in air on a 220 ma. drain (cathode current density—20 ma./cm.$^2$) at between 1.2 and 0.6 volt for only 1.5 hours.

(b) The same cell with an electrolyte containing 30 weight percent $ZnCl_2+10$ weight percent KOCN (based on total weight of electrolyte) operated for 40 hours between 1.05 and 0.75 volt, producing about 220 ma. initially and about 150 ma. finally, corresponding to a cathode current density of between 20 and 15 ma./cm.$^2$ over the entire discharge period.

EXAMPLE 2

(a) A D-size air-depolarized cell was assembled with a spinel-catalyzed, porous carbon cathode tube (same type as that described in Example 1), a magnesium can as anode, and an aqueous electrolyte containing 20 weight percent $MgBr_2+1$ weight percent $K_2CrO_4$ (percentage based on total weight of electrolyte), the latter serving as a corrosion inhibitor for the magnesium anode. (This electrolyte is well-known in magnesium cell art.) This cell operated for only ½ hour on a 4-ohm load (220 ma. drain) until the cathode became incapable of further operation, apparently because the porous carbon became plugged with $Mg(OH)_2$.

(b) A similar cell containing 20 weight percent KSCN in the $MgBr_2$-$K_2CrO_4$ electrolyte operated for 60 hours on the same load at an initial voltage of 1.25, which finally became 1.1 volts after 20 hours. At that time, water was added to the electrolyte and the voltage rose to 1.2 volts again. Another addition of water after another 20-hour discharge period on the same load permitted the cell to operate for a toal of 60 hours until the magnesium can perforated. The final voltage was still 1.1 volts. The pH's of both electrolytes described in this example were about 6, prior to cell operation.

EXAMPLE 3

Figure 3:
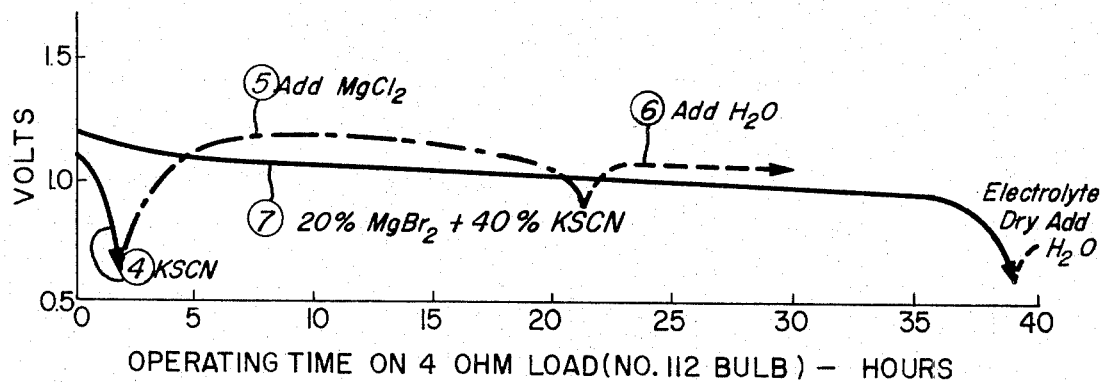

A number of magnesium-air reserve cells were constructed according to the sketch shown in FIG. 1. The anode of each cell was a magnesium can and the cathode was a shorter (1½ inches long) version of the spinel-catalyzed porous carbon tube used in the cells of Examples 1 and 2. A shorter cathode was used to make room in the cell for a greater quantity of electrolyte, since this cell system tends to dry out on discharge. The end of this test cell was left open to add the electrolyte, which was then absorbed into the wicking material (Webril). ("Webril" is a non-woven fabric made by blending thermo plastic fibers into a cotton web, and applying heat and pressure.) FIGS. 2 and 3 show the performance of this test cell on a 4-ohm load with 20 weight percent $MgBr_2$, 20 weight percent $MgCl_2$, and 40 weight percent KSCN aqueous electrolytes alone (Curves 1, 2 and 4, respectively). Cell voltage dropped rapidly in all three instances, particularly with $MgBr_2$ and KSCN alone. The KSCN alone passivated the magnesium anode. The chloride and bromide electrolytes interferred with cathode operation. When KSCN solution (final KSCN concentration, 20%) was added to the cell containing 20% $MgCl_2$ electrolyte (Curve 3), the voltage rose to 1.2 volts. A similar voltage rise (Curve 5) was observed on addition of 20% $MgCl_2$ solution to the KSCN electrolyte (final concentrations; 10% $MgCl_2$, 20% KSCN). After 21.5 hours on discharge, the cell voltage again dropped but was restored after the addition of water (Curve 6).

In contrast to cell behavior with each of these salts as the sole solute, a similar cell with an electrolyte comprising a 1:1 (by weight) mixture of 20% $MgBr+40\%$ KSCN was discharged on the same load for about 35 hours, during the first 23 hours of which the cell voltage was 1.0 volt or above. After 39 hours, the cell voltage had dropped considerably due to consumption of water in the cell reaction. Upon addition of water, the voltage rose again. Curve 7 depicts the performance of this cell. The pH's of the electrolytes in this example were all about 6 prior to operation of the cells.

EXAMPLE 4

(a) A magnesium-air flat cell was constructed using a thin "fixed zone," plastic-bonded carbon electrode as cathode,[1] a magnesium sheet anode and 75 ml. of 1:1 (by volume) mixture of a 20% $MgCl_2$ solution and a 5 M KSCN (40% by weight) solution (pH about 6). Apparent cathode area was 5 in.[2]. The cathode was catalyzed with 1 mg./cm.[2] of ferric phthalocyanine catalyst.[2] This cell, ma. drain; its discharge performance is shown in FIG. 4, which had a capacity of 100 whr./lb., was placed on a 600 The electrolyte was stirred at 5, 10 and 15-hour intervals. The increased cell voltage observed immediately after stirring indicates diffusion limitations arising from the precipitation of $Mg(OH)_2$ during cell discharge.

(b) FIG. 5 shows a schematic drawing of a similar flat metal-air cell assembly but with two "fixed zone" cathodes, one on either side of the metal anode plate. The cell can be activated at the time of assembly by pre-soaking the separators with the aqueous electrolyte solution. Alternatively, a reserve cell construction can be made by providing a filling port (not shown) for electrolyte entry when activation is desired.

What is claimed is:

1. In an air-depolarized cell including a porous air cathode, a consumable metal anode, and an aqueous halide salt electrolyte, the improvement in which said aqueous electrolyte has a pH within the range of from about 5 to about 9 and in which a sufficient amount of a cyanate or thiocyanate is present in said aqueous electrolyte to combine with metal oxides and hydroxides formed in situ during operation of said cell to substantially prevent precipitation of said oxides and hydroxides thereby substantially preventing the blocking of said cathode.

2. The air-depolarized cell of claim 1 wherein the cation of the salt and that of the anode are identical.

3. The air-depolarized cell of claim 1 wherein the cathode is carbon, silver or nickel; wherein the anode is magnesium, aluminum, cadmium or zinc; and wherein the halide salt in the electrolyte solution is chloride, bromide or mixtures thereof.

4. The air-depolarized cell of claim 3 wherein the halide salt and the cyanate or thiocyanate are present in the electrolyte solution in a concentration of at least about 10 weight percent, based on the total weight of the electrolyte.

5. The air-depolarized cell of claim 4 wherein the concentration of the halide salt and the cyanate or thiocyanate in the electrolyte solution is from about 20 to about 40 weight percent, based on total weight of the electrolyte.

6. The air-depolarized cell of claim 4 wherein the chloride salt or bromide salt of the electrolyte is selected from the group consisting of alkali metal, alkaline earth metal, aluminum, zinc and ammonia; wherein the cyanate or thiocyanate of the electrolyte is selected from the group consisting of alkali metal, alkaline earth metal, aluminum, zinc and ammonia; and wherein the proportion on a weight basis of the halide salt to the cyanate or thiocyanate is from about 30:70 to about 70:30.

7. The air-depolarized cell of claim 4 wherein the halide salt, or the cyanate or thiocyanate, is present in less than about 75 percent of its saturation concentration.

8. The air-depolarized cell of claim 7 wherein the chloride salt or bromide salt is selected from at least one member of the group consisting of sodium, potassium, magnesium, zinc, aluminum and ammonia.

9. The air-depolarized cell of claim 8 wherein thiocyanate is present in said aqueous electrolyte.

10. The air-depolarized cell of claim 8 wherein the proportion, on a weight basis, of the halide salt to the cyanate or thiocyanate is within the range of from about 60:40 to about 40:60.

11. The air-depolarized cell of claim 8 wherein the halide salt and the cyanate or thiocyanate is present in the electrolyte solution in a concentration of from about 20 to about 40 weight percent, based on the weight of electrolyte.

12. The air-depolarized cell of claim 8 wherein the anode is magnesium or zinc.

13. The air-depolarized cell of claim 8 wherein the cathode comprises carbon; wherein the anode is magnesium; and wherein the halide salt is selected from at least one of the groups consisting of magnesium bromide, magnesium chloride, zinc chloride and zinc bromide.

14. The air-depolarized cell of claim 13 wherein thiocyanate is present in said aqueous electrolyte.

References Cited

UNITED STATES PATENTS

| 2,921,110 | 1/1960 | Crowley et al. | 136—86 A |
| 3,423,242 | 1/1969 | Meyers et al. | 136—6 |
| 3,594,235 | 7/1971 | Noran | 136—155 X |

FOREIGN PATENTS

| 784,913 | 5/1955 | Great Britain | 136—154 |

OTHER REFERENCES

Panzer et al.: "Electrochemistry in Fused Alkali Thiocyanates," in J. Electrochem. Soc., vol. 112, No. 11, November 1965, TP/250/A54 S, pp. 1136–1143.

ALLEN B. CURTIS, Primary Examiner

U.S. Cl. X.R.

136—155, 86 E

---

[1] The "fixed-zone" electrode comprised carbon bonded with polytetrafluoroethylene. The carbon was bonded, with Polytetrafluoroethylene, to a porous nickel sheet. "Fixed zone" electrodes are known in the art. For instance, they are described in an article by Clark, Darland and Kordesch, "Composite Carbon-Metal Electrodes for Fuel Cells," Electrochemical Technology 3, No. 5–6, 166 (May–June 1965).

[2] The ferric phthalocyanine catalyst was applied from pyridine solution.

PO-1050
(5/69)

UNITED STATES PATENT OFFICE
CERTIFICATE OF CORRECTION

Patent No. 3,783,026             Dated January 1, 1974

Inventor(s) Karl V. Kordesch

It is certified that error appears in the above-identified patent and that said Letters Patent are hereby corrected as shown below:

IN THE SPECIFICATION:

Column 1, line 63, "than" should be -- that --.

Column 5, line 15 should be sequentially positioned immediately after line 16, thereby becoming line 16.

Signed and sealed this 7th day of January 1975.

(SEAL)
Attest:

McCOY M. GIBSON JR.　　　　　　　　C. MARSHALL DANN
Attesting Officer　　　　　　　　　Commissioner of Patents